United States Patent
Lin

(10) Patent No.: US 11,340,712 B2
(45) Date of Patent: May 24, 2022

(54) TEXT INPUT METHOD AND TERMINAL

(71) Applicant: VIVO MOBILE COMMUNICATION CO., LTD., Chang'an Dongguan (CN)

(72) Inventor: Songjie Lin, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/164,077

(22) Filed: Feb. 1, 2021

(65) Prior Publication Data
US 2021/0157415 A1 May 27, 2021

Related U.S. Application Data

(63) Continuation of application No. PCT/CN2019/096086, filed on Jul. 16, 2019.

(30) Foreign Application Priority Data

Aug. 1, 2018 (CN) .......................... 201810862769.2

(51) Int. Cl.
*G06F 40/00* (2020.01)
*G06F 3/023* (2006.01)
(Continued)

(52) U.S. Cl.
CPC ........ *G06F 3/0233* (2013.01); *G06F 3/04883* (2013.01); *G06F 3/167* (2013.01);
(Continued)

(58) Field of Classification Search
CPC .. G06F 40/166; G06F 3/04883; G06F 3/0233; G06F 40/106; G10L 15/22; G10L 15/26
See application file for complete search history.

(56) References Cited

U.S. PATENT DOCUMENTS 6,438,523 B1 * 8/2002 Oberteuffer ............. G06F 3/038
704/270
6,661,920 B1 12/2003 Skinner
(Continued)

FOREIGN PATENT DOCUMENTS

CN 1866171 A 11/2006
CN 102109954 A 6/2011
(Continued)

OTHER PUBLICATIONS

International Search Report & Written Opinion related to Application No. PCT/CN2019/096086; reported on Feb. 11, 2021.
(Continued)

*Primary Examiner* — Scott T Baderman
*Assistant Examiner* — Barbara M Level
(74) *Attorney, Agent, or Firm* — von Briesen & Roper, s.c.

(57) ABSTRACT

A text input method and a terminal are provided. The method includes: displaying a text editing interface when a trigger operation for triggering text input is detected, where the text editing interface includes: input operation areas of at least two input methods and text display areas for displaying text input by using the input methods; and keeping displaying the input operation areas of the at least two input methods on the currently displayed text editing interface when a switching operation for switching from one of the currently used at least two input methods to another input method is detected on the currently displayed text editing interface.

15 Claims, 8 Drawing Sheets

(51) Int. Cl.

| | | |
|---|---|---|
| *G06F 40/166* | (2020.01) | |
| *G06F 3/04883* | (2022.01) | |
| *G06F 3/16* | (2006.01) | |
| *G10L 15/22* | (2006.01) | |
| *G10L 15/26* | (2006.01) | |

(52) U.S. Cl.
CPC ............ *G06F 40/166* (2020.01); *G10L 15/22* (2013.01); *G10L 15/26* (2013.01)

(56) References Cited

U.S. PATENT DOCUMENTS

| | | | | |
|---|---|---|---|---|
| 11,209,976 | B2* | 12/2021 | Couelier | ............ G06F 3/04883 |
| 2004/0071344 | A1* | 4/2004 | Lui | ...................... G06K 9/6293 |
| | | | | 382/181 |
| 2004/0078189 | A1 | 4/2004 | Wen et al. | |
| 2011/0202836 | A1* | 8/2011 | Badger | .................. G06N 20/00 |
| | | | | 715/702 |
| 2013/0234945 | A1* | 9/2013 | Goktekin | ................ G06F 3/005 |
| | | | | 345/168 |
| 2013/0249810 | A1* | 9/2013 | Almosnino | ......... G06F 3/04886 |
| | | | | 345/173 |
| 2014/0365949 | A1* | 12/2014 | Xia | ..................... G06F 3/04883 |
| | | | | 715/780 |
| 2016/0124564 | A1* | 5/2016 | Huang | .................. G06F 3/0233 |
| | | | | 345/173 |
| 2021/0157415 | A1 | 5/2021 | Lin | |

FOREIGN PATENT DOCUMENTS

| | | |
|---|---|---|
| CN | 102510421 A | 6/2012 |
| CN | 103246437 A | 8/2013 |
| CN | 103838468 A | 6/2014 |
| CN | 104915022 A | 9/2015 |
| CN | 106020699 A | 10/2016 |
| CN | 106354276 A | 1/2017 |
| CN | 106886354 A | 6/2017 |
| CN | 108052212 A | 5/2018 |
| CN | 109032380 A | 12/2018 |
| EP | 2778879 A2 | 9/2014 |
| JP | 2004145732 A | 5/2004 |

OTHER PUBLICATIONS

First Chinese Office Action far related Application No. 201810862769.2; reported on Jan. 6, 2020.

Extended European Search Report related to Application No. 19845388.8; dated Aug. 31, 2021.

* cited by examiner

TEXT INPUT METHOD AND TERMINAL

CROSS-REFERENCE TO RELATED APPLICATIONS

This application is a continuation application of International Application No. PCT/CN2019/096086 filed on Jul. 16, 2019, which claims priority to Chinese Patent Application No. 201810862769.2, filed in China on Aug. 1, 2018, both disclosures of which are incorporated herein by reference in their entireties.

TECHNICAL FIELD

Embodiments of this disclosure relate to the field of text input technologies, and in particular, to a text input method and a terminal.

BACKGROUND

As terminals develop, more users use applications installed on the terminals, such as email, chat, SMS, and office applications. When using these applications, the users often need to use input methods for text input.

In the related art, when a user uses an input method for text input, only one input method is supported for text input on a text editing interface, and text input efficiency is low. Therefore, after selecting an input method, the user has to endure the inconvenience brought by this input method. For example, when a user uses a 26-key input method to input text on a text editing interface corresponding to the 26-key input method, although an input matching degree is high, alphabetic keys are small, and it is easy to tap a wrong key; when a user uses a nine-grid input method to input text on a text editing interface corresponding to the nine-grid input method, although keys are large enough, a matching degree is not high enough after input, and it is difficult to match text that the user wants to input; when a user uses a voice input method to input text, text that the user wants to input cannot be matched due to inaccurate pronunciation or noisy environment during pronunciation; and when a user uses a handwriting input method to input text, it takes a relatively long time to input text with many strokes, which is inconvenient. When a user wants to use other input methods for text input, the user needs to actively switch an input method. In this case, a text editing interface corresponding to the currently used input method disappears and is replaced with a new text editing interface. However, the new text editing interface still supports only one input method for text input, and text input efficiency is low, bringing inconvenience to users.

Therefore, how to input text more efficiently and accurately is a technical problem to be resolved urgently.

SUMMARY

According to a first aspect, an embodiment of this disclosure provides a text input method, applied to a terminal and including:

displaying a text editing interface when a trigger operation for triggering text input is detected, where the text editing interface includes: input operation areas of at least two input methods and text display areas for displaying text input by using the input methods; and keeping displaying the input operation areas of the at least two input methods on the currently displayed text editing interface when a switching operation for switching from one of the currently used at least two input methods to another input method is detected on the currently displayed text editing interface.

According to a second aspect, an embodiment of this disclosure provides a terminal, including:

a first display module, configured to display a text editing interface when a trigger operation for triggering text input is detected, where the text editing interface includes: input operation areas for at least two input methods and text display areas for displaying text input by using the input methods; and a second display module, configured to keep displaying the input operation areas of the at least two input methods on the currently displayed text editing interface when a switching operation for switching from one of the currently used at least two input methods to another input method is detected on the currently displayed text editing interface.

According to a third aspect, an embodiment of this disclosure provides a terminal, including a processor, a memory, and a computer program stored in the memory and capable of running on the processor, where when the computer program is executed by the processor, the steps of the foregoing text input method are implemented.

According to a fourth aspect, an embodiment of this disclosure provides a computer-readable storage medium, where the computer-readable storage medium stores a computer program, and when the computer program is executed by a processor, the steps of the foregoing text input method are implemented.

DESCRIPTION OF EMBODIMENTS

The following clearly and completely describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

Figure 1:
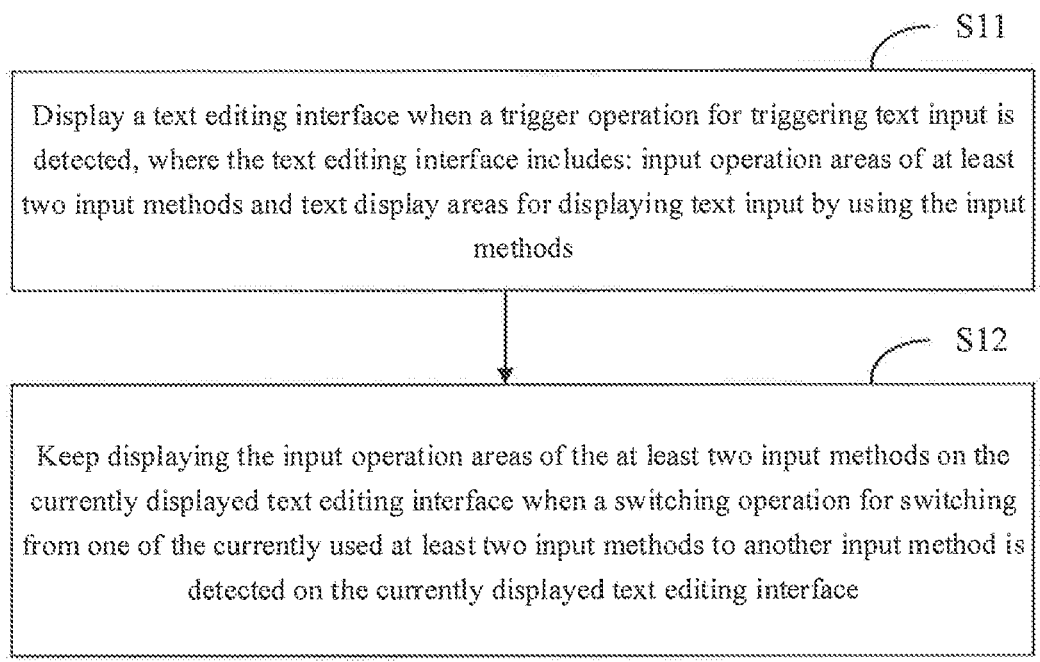
FIG. 1 is a schematic flowchart of a text input method according to Embodiment 1 of this disclosure.

FIG. 1 is a schematic flowchart of a text input method according to Embodiment 1 of this disclosure. The method includes the following steps:

Step S11: Display a text editing interface when a trigger operation for triggering text input is detected, where the text editing interface includes: input operation areas of at least two input methods and text display areas for displaying text input by using the input methods.

Step S12: Keep displaying the input operation areas of the at least two input methods on the currently displayed text editing interface when a switching operation for switching from one of the currently used at least two input methods to another input method is detected on the currently displayed text editing interface.

Based on the foregoing method, a user can use the at least two input methods on the currently displayed text editing interface for text input. This avoids frequent switching between text editing interfaces in switching an input method, and effectively improves efficiency and accuracy of text input.

In this embodiment, the trigger operation for triggering text input may be a tap operation of tapping on a text input area (for example, a text edit box and a search box) of an application such as SMS, email, and WeChat.

In this embodiment, the at least two input methods may include at least two of the following: a key input method, a voice input method, and a handwriting input method.

The key input method may include: a Wubi input method, a Pinyin input method, or a foreign language input method. The key input method may be a 26-key input method or a nine-grid input method, to meet different needs of users and improve text input efficiency of the users.

In some optional embodiments of this disclosure, when the at least two input methods include the key input method, an input operation area of the key input method includes a keypad area.

Figure 2:
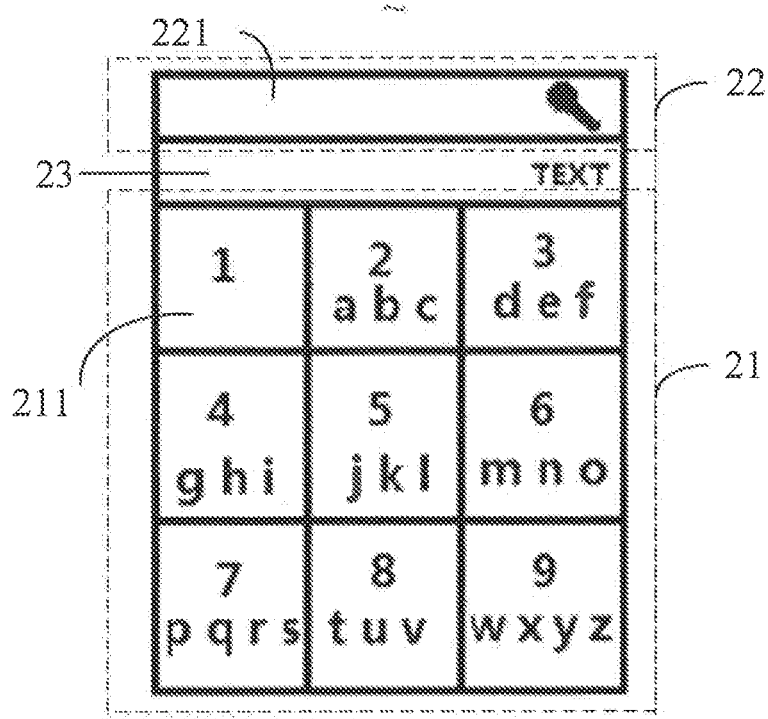
FIG. 2 is a schematic diagram of a text editing interface according to an embodiment of this disclosure.

For example, FIG. 2 is a schematic diagram of a text editing interface 20 supporting the voice input method and the nine-grid input method. In the text editing interface 20, an input operation area 21 of the nine-grid input method may include a keypad area 211.

Certainly, the input operation area 21 of the key input method may further include a key-matched text selection area (not shown in the figure) for displaying at least one group of candidate text, so that the user selects text to be input in the key-matched text selection area.

In some other optional embodiments of this disclosure, when the at least two input methods include the voice input method, an input operation area of the voice input method includes a voice-matched text selection area for displaying at least one group of candidate text.

Still referring to FIG. 2, in the text editing interface 20, an input operation area 22 of the voice input method may include a voice-matched text selection area 221, so that text information obtained through matching based on voice information of the user is displayed in the voice-matched text selection area 221, which is convenient for a user to select.

In some optional embodiments of this disclosure, when the at least two input methods include the handwriting input method, an input operation area of the handwriting input method includes a handwriting area.

The handwriting area may be a preset area on the text editing interface, for example, the entire text editing interface. The handwriting area is large and convenient for a user to perform a handwriting operation; and certainly, the preset area may be set according to an actual need, which is more flexible and convenient.

Figure 3:
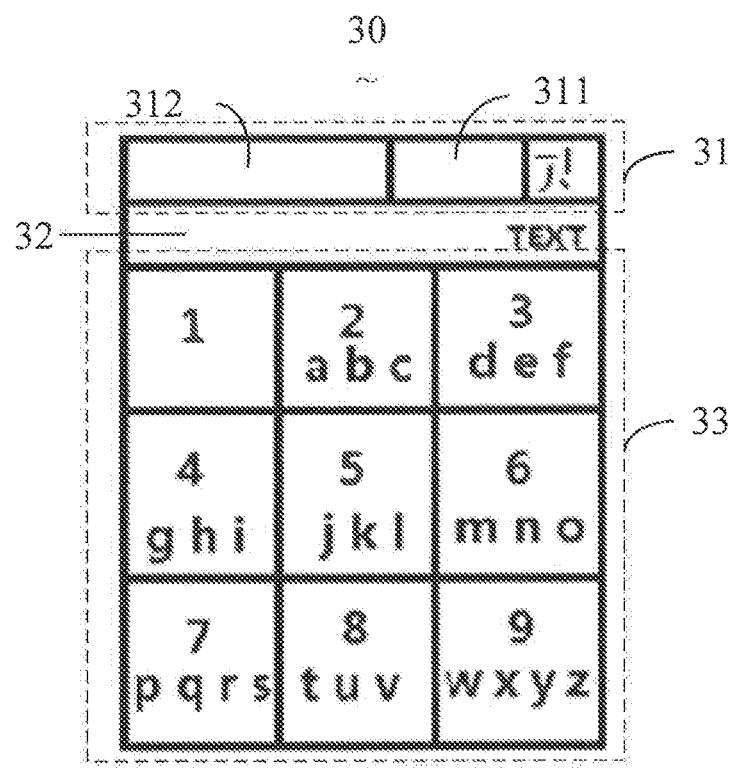
FIG. 3 is another schematic diagram of a text editing interface according to an embodiment of this disclosure.

For example, FIG. 3 is a schematic diagram of a text editing interface 30 supporting the handwriting input method and the key input method. In the text editing interface 30, an input operation area 31 of the handwriting input method includes a handwriting area 311.

Certainly, the input operation area 31 of the handwriting input method may further include a handwriting-matched text selection area 312 for displaying at least one group of candidate text, so that text information obtained through matching based on a text stroke handwritten by a user is displayed in the handwriting-matched text selection area 312, which is convenient for the user to select text to be input on the handwriting-matched text selection area 312.

Optionally, the key-matched text selection area, the voice-matched text selection area, and the handwriting-matched text selection area display a preset quantity of groups of candidate text, and the preset quantity of groups may be set according to a need.

Optionally, the key-matched text selection area, the voice-matched text selection area, and the handwriting-matched text selection area also display more keys for indicating to display more groups of candidate text.

Optionally, the preset quantity of groups of candidate text displayed on the key-matched text selection area, the voice-matched text selection area, and the handwriting-matched text selection area may be switched based on a detected sliding operation.

In some optional embodiments of this disclosure, step S12 includes:

when a switching operation for switching from one of the currently used at least two input methods to another input method is detected, clearing all text in the input operation area of the currently used input method, and determining the currently used input method as the another input method.

In other words, during the switching from one input method in the currently used text editing interface to another input method, all the text in the input operation area of the input method used before the switching is cleared.

Optionally, when the at least two input methods include the key input method, step S12 includes:

when it is detected that a currently used input method is an input method other than the key input method in the at least two input methods, and it is detected that a key in the keypad area is tapped, clearing all text in the input operation area of the currently used input method, switching the currently used input method to the key input method, and obtaining text information input in the keypad area.

In other words, when it is detected that any key in the keypad area is tapped in a process of using an input method other than the key input method for text input, all the text in the input operation area of the currently used input method is cleared, and the currently used input method is switched to the key input method immediately for subsequent text input.

Figure 4:
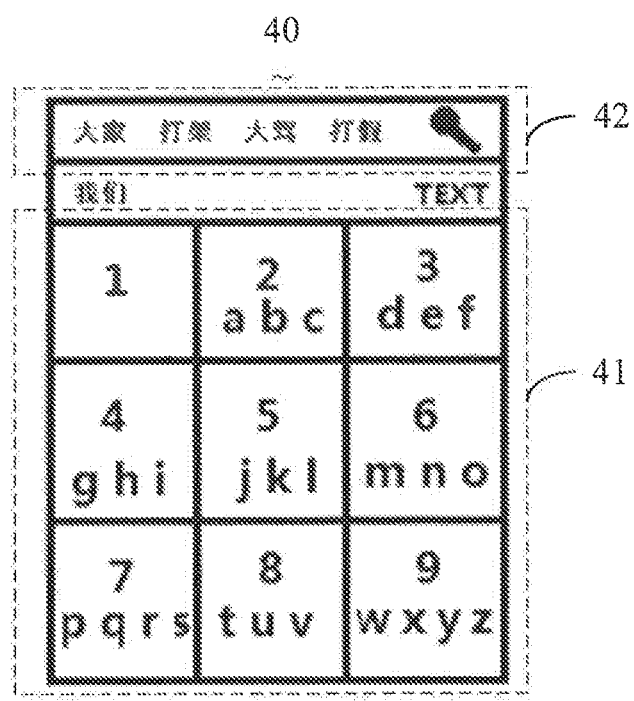
FIG. 4 is another schematic diagram of a text editing interface according to an embodiment of this disclosure.
Figure 5:
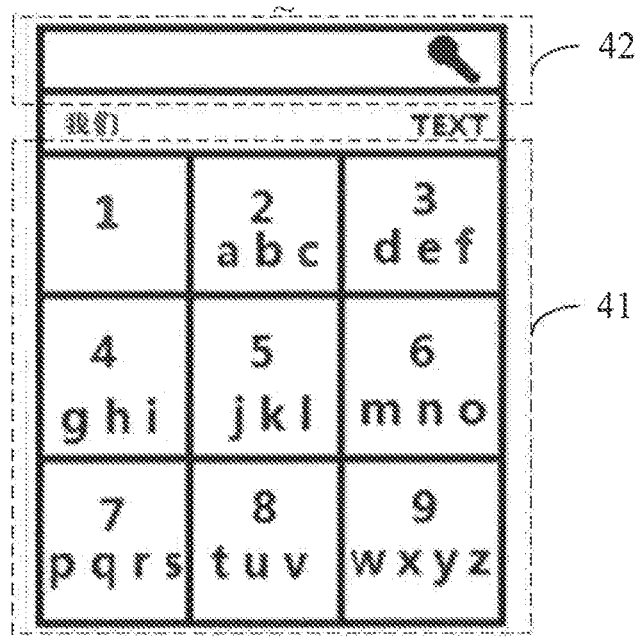
FIG. 5 is another schematic diagram of a text editing interface according to an embodiment of this disclosure.

For example, referring to FIG. 4 and FIG. 5, a user uses a text editing interface on which the voice input method and the key input method can be used to input text. When the user uses the voice input method to input text, a text editing interface 40 displayed is shown in FIG. 4. In the text editing interface 40, the input operation area of the key input method is a keypad area 41, and the input operation area of the voice input method is a voice-matched text selection area 42. When it is detected that a key in the keypad area 41 is tapped, all text on the voice-matched text selection area 42 is cleared, as shown in FIG. 5.

In some optional embodiments of this disclosure, after the step of displaying a text editing interface, the method further includes:

when it is detected that one of the at least two input methods is used for text input, displaying at least one group of candidate text corresponding to input information in the input operation area of the currently used input method; and when it is detected that a group of candidate text in the at least one group of candidate text is selected, adding the selected text to the text display area.

The text obtained through matching based on detected voice information may be a word (including a letter and a Chinese character), words, or a sentence. A selection operation of selecting a group of candidate text may be a tapping operation of tapping a group of candidate text.

After adding the selected text to the text display area, all text in the input operation area of the currently used input method can be cleared.

Figure 6:
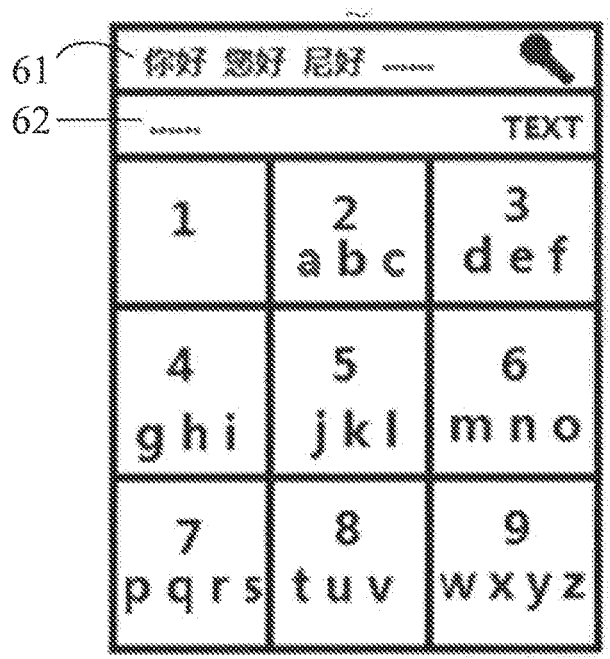
FIG. 6 is another schematic diagram of a text editing interface according to an embodiment of this disclosure.
Figure 7:
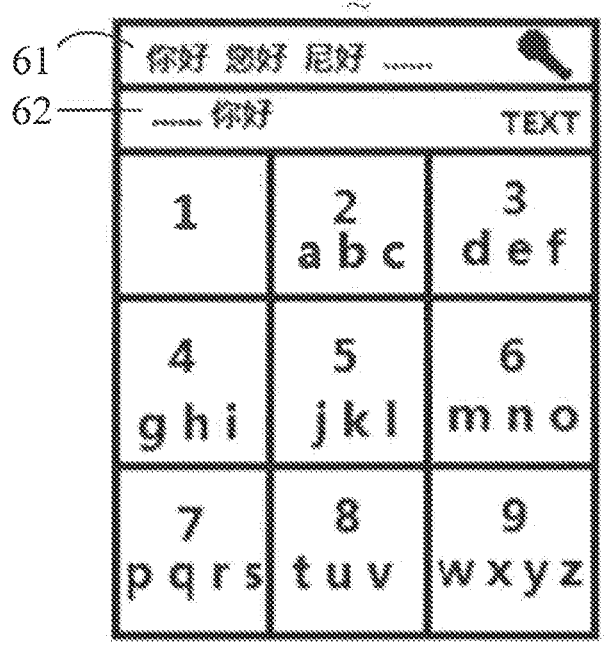
FIG. 7 is another schematic diagram of a text editing interface according to an embodiment of this disclosure.
Figure 8:
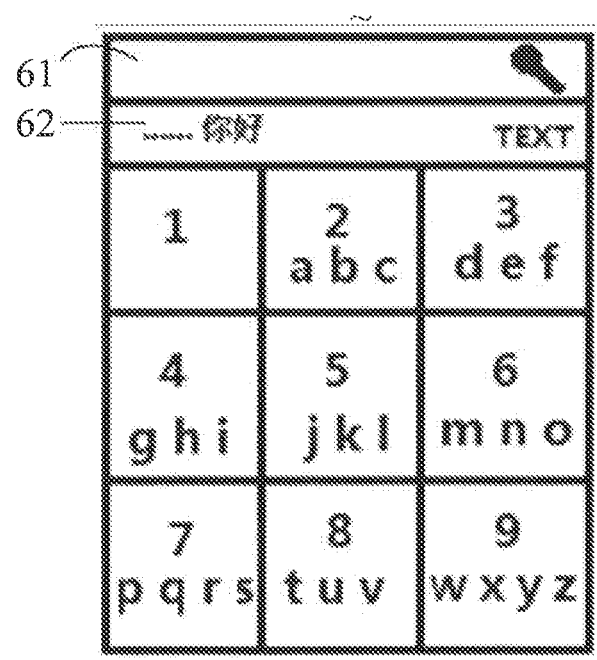
FIG. 8 is another schematic diagram of a text editing interface according to an embodiment of this disclosure.

For example, referring to FIG. 6 to FIG. 8, when the voice input method is used for text input, the input operation area of the voice input method is a voice-matched text selection area 61. When a voice message with voice content of "你好" is detected, text matching is performed on the detected voice message, and three groups of matched candidate text (你好, 您好, and 尼好) are displayed side by side in the voice-matched text selection area 61 of the text editing interface 60, as shown in FIG. 6; and when a selection operation of selecting "你好" in the voice-matched text selection area 61 is detected, the selected text "你好" is added to a text display area 62, as shown in FIG. 7, and all the text in the voice-matched text selection area 61 is cleared, as shown in FIG. 8.

Figure 9:
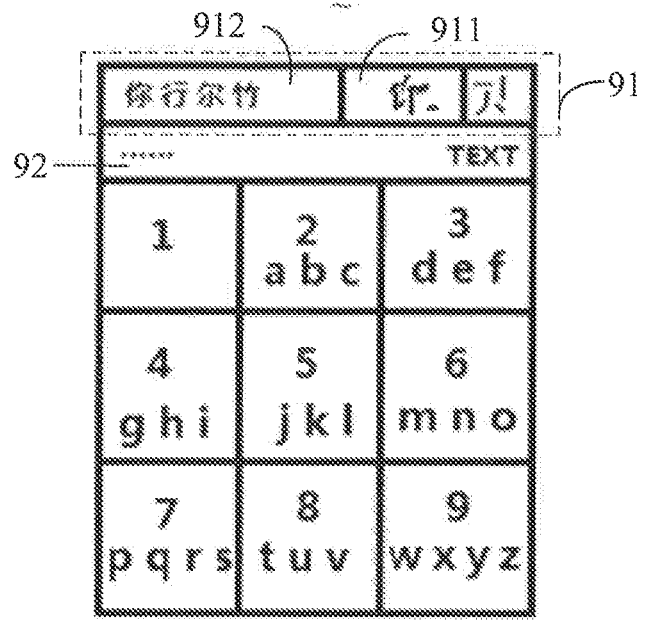
FIG. 9 is another schematic diagram of a text editing interface according to an embodiment of this disclosure.
Figure 10:
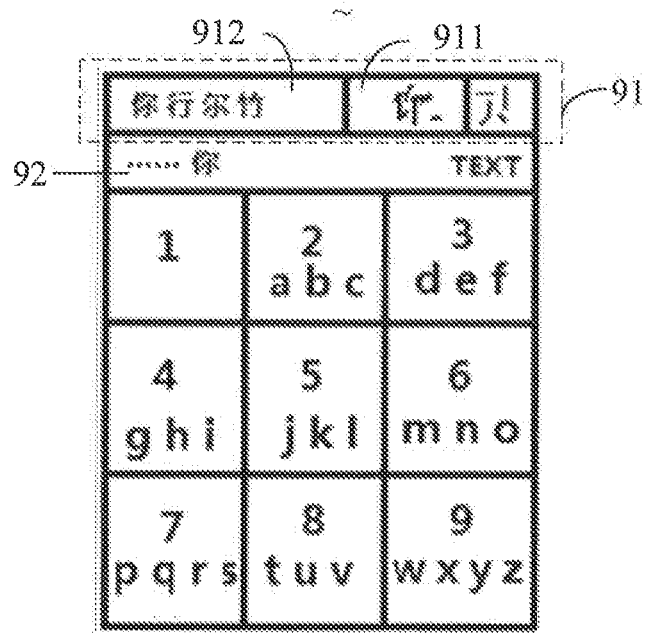
FIG. 10 is another schematic diagram of a text editing interface according to an embodiment of this disclosure.
Figure 11:
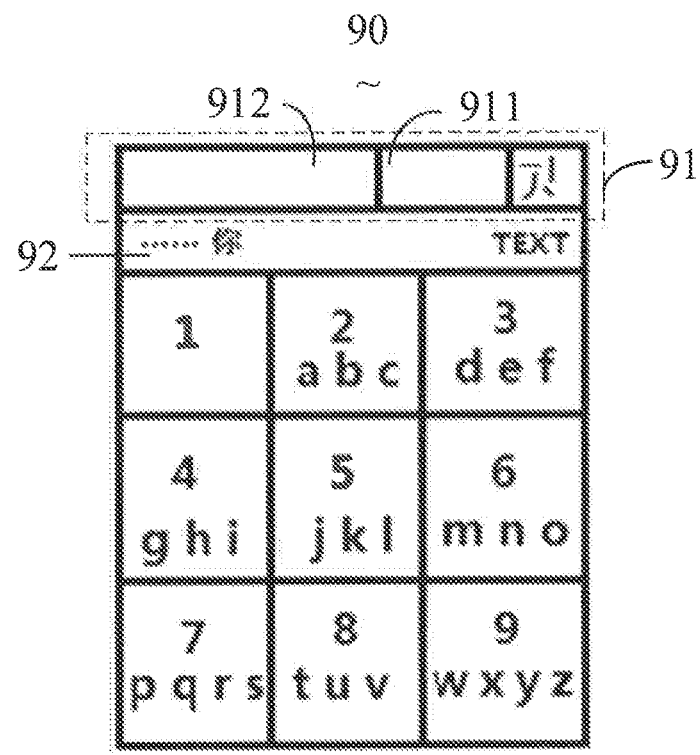
FIG. 11 is another schematic diagram of a text editing interface according to an embodiment of this disclosure.

For another example, referring to FIG. 9 to FIG. 11, when the handwriting input method is used for text input, an input operation area 91 of the handwriting input method includes a handwriting area 911 and a handwriting-matched text selection area 912. When it is detected that a user writes strokes of text content "你" in the handwriting area 911, text matching is performed on detected stroke information, and four groups of matched candidate text (你, 行, 尔, and 竹) are displayed side by side in the handwriting-matched text selection area 912 of the text editing interface 90. When a selection operation of selecting "你" in the handwriting-matched text selection area 912 is detected, the selected text "你" is added to a text display area 92, as shown in FIG. 10, and all the text in the input operation area 91 (including the handwriting area 911 and the handwriting-matched text selection area 912) of the handwriting input method is cleared, as shown in FIG. 11.

Certainly, after the selected text is added to the text display area, the text in the input operation area of the currently used input method may alternatively not be cleared.

Specifically, after the selected text is added to the text display area, an associated word or associated words of the selected text may be displayed in the input operation area. For example, when the text selected by a user is "阳光", "阳光" is added to the text display area, and an associated word or associated words of "阳光" such as 明媚, 下, 好, and 真好 are displayed in the input operation area.

In some optional embodiments of this disclosure, when the at least two input methods include the voice input method, after the step of displaying a text editing interface, the method further includes:

when voice information of a user is detected and there is no input operation performed by using another input method on the text editing interface, obtaining collected voice information, and converting the voice information into text information.

In other words, when the at least two input methods include the voice input method, voice information is always collected in real time during text input, and only when the voice information is collected and no other input method is used to input text, the collected voice information is converted into text information.

In some optional embodiments of this disclosure, when the at least two input methods include the handwriting input method, after the step of displaying a text editing interface, the method further includes:

when a handwriting operation in the handwriting area is detected, determining that a currently used input method is the handwriting input method, and obtaining text information input in the handwriting area.

In other words, when it is detected that a user writes in the handwriting area, if a previously used input method is not the handwriting input method, the input method is switched to the handwriting input method; if the handwriting input method is used before, the handwriting input method is still used for text input, text matching is performed on written stroke information, and text information input by using the handwriting input method is obtained.

In some optional embodiments of this disclosure, the input operation areas of the at least two input methods on the currently displayed text editing interface include an input operation area of a first input method and an input operation area of a second input method, and do not include an input operation area of a third input method, and after the step of displaying a text editing interface, the method further includes:

when a switching operation for switching from the first input method to the third input method is detected, displaying a new text editing interface, where the new text editing interface includes: the input operation of the second input method area, the input operation area of the third input method, and the text display area, and the third input method is different from both the first input method and the second input method.

In other words, on the currently displayed text editing interface, the first input method and the second input method can be used for text input, but the third input method cannot be used for text input. When the switching operation for switching from the first input method to the third input method is detected, the new text editing interface is displayed, and the second input method and the third input method can be used on the new text editing interface for text input.

The switching operation for switching from the first input method to the third input method is a tapping operation of tapping a switch key that is displayed on the text editing interface and that is used to instruct to switch an input method. The switch key may be a key preset according to an actual need, and may be located at any position on the text editing interface, which is more flexible and convenient.

For example, still referring to FIG. 2 and FIG. 3, the first input method, the second input method, and the third input method are: a voice input method, a key input method, and a handwriting input method, respectively. On the text editing interface 20 in FIG. 2, the input operation area 22 of the voice input method is the voice-matched text selection area 221, and a rightmost microphone key in the voice-matched text selection area 221 is the switch key. When it is detected that the microphone key is tapped, a new text editing interface 30 is displayed, as shown in FIG. 3. On the new text editing interface 30, including: a text display area 32, an input operation area 33 of the key input method, and an input operation area 31 (including a handwriting area 311 and a handwriting-matched text selection area 312) of the handwriting input method, the key input method and the handwriting input method can be used for text input.

For another example, still referring to FIG. 2 and FIG. 3, the first input method, the second input method, and the third input method are: a handwriting input method, a key input method, and a voice input method, respectively. In the text editing interface 30 in FIG. 3, a stroke key on a rightmost input operation area 31 of the handwriting input method is the switch key. When it is detected that the stroke key is tapped, a new text editing interface 20 is displayed, as shown in FIG. 2. On the new text editing interface 20, including: a text display area 23, an input operation area 21 of the key input method, and an input operation area 22 of the voice input method, the key input method and the voice input method can be used for text input.

Figure 12:
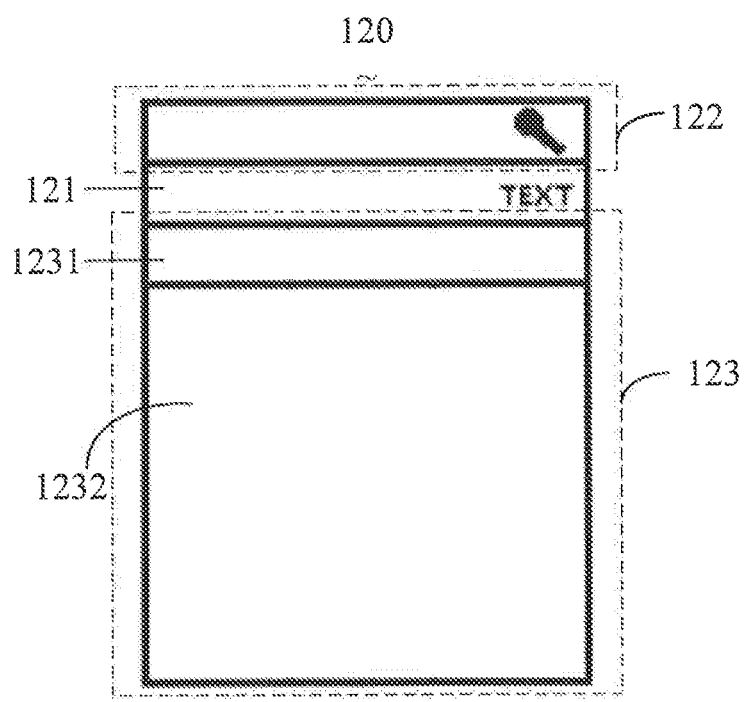
FIG. 12 is another schematic diagram of a text editing interface according to an embodiment of this disclosure.

For another example, referring to FIG. 2 and FIG. 12, the first input method, the second input method, and the third input method are: a key input method, a voice input method, and a handwriting input method, respectively. On the text editing interface 20 in FIG. 2, a key "1" in the keypad area 211 is the switch key. When it is detected that the key "1" is tapped, a new text editing interface 120 is displayed, as shown in FIG. 12. On the new text editing interface 120, including: a text display area 121, an input operation area 122 of the voice input method, and an input operation area 123 (including a handwriting-matched text selection area 1231 and a handwriting area 1232) of the handwriting input method, the voice input method and the handwriting input method can be used for text input.

Figure 13:
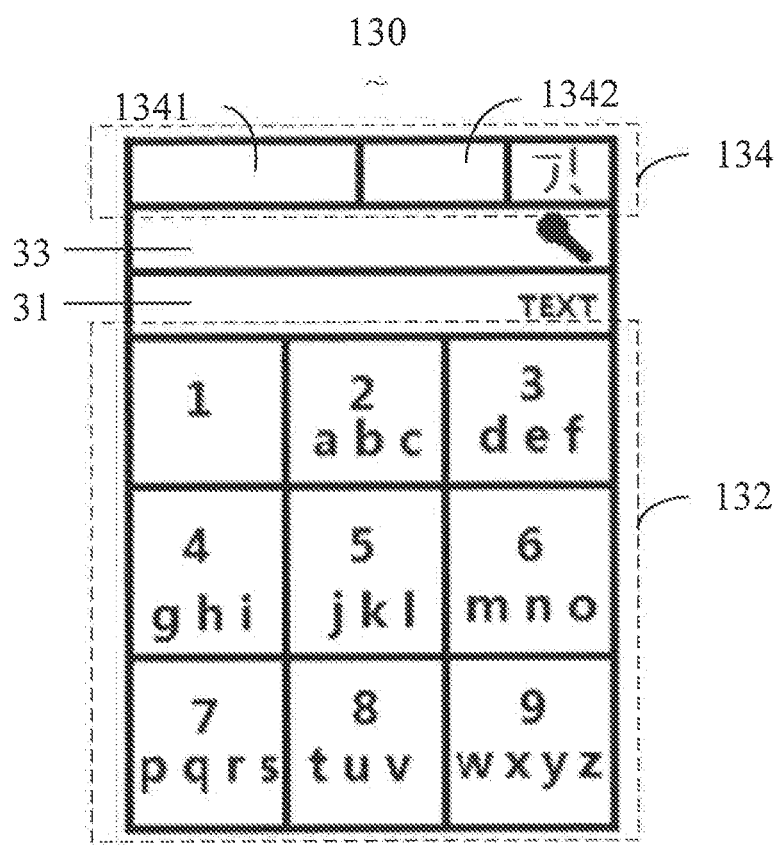
FIG. 13 is another schematic diagram of a text editing interface according to an embodiment of this disclosure.

Referring to FIG. 13, in some specific embodiments of this disclosure, on the text editing interface 130, three input methods (for example, a key input method, a voice input method, and a handwriting input method) can be used for text input. The text editing interface 130 includes a text display area 131, an input operation area 132 of the key input method, an input operation area 133 of the voice input method, and an input operation area 134 of the handwriting input method. The input operation area 134 of the handwriting input method includes a handwriting-matched text selection area 1341 and a handwriting area 1342.

Therefore, a user can use the three input methods for text input on the text editing interface, and can immediately use any desired input method, avoiding frequent switching between text editing interfaces, reducing a text input time for the user, and effectively improving the efficiency of text input.

Figure 14:
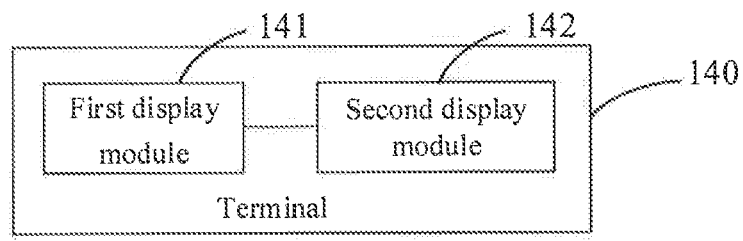
FIG. 14 is a schematic structural diagram of a terminal according to Embodiment 2 of this disclosure.

Based on the same disclosed concept as the foregoing text input method, this disclosure further provides a terminal. FIG. 14 is a schematic structural diagram of a terminal 140 according to Embodiment 2 of this disclosure. The terminal 140 includes:

a first display module 141, configured to display a text editing interface when a trigger operation for triggering text input is detected, where the text editing interface includes: input operation areas for at least two input methods and text display areas for displaying text input by using the input methods; and a second display module 142, configured to keep displaying the input operation areas of the at least two input methods on the currently displayed text editing interface when a switching operation for switching from one of the currently used at least two input methods to another input method is detected on the currently displayed text editing interface.

The terminal in this disclosure can display a text editing interface on which the at least two input methods can be used for text input. This avoids frequent switching between text editing interfaces in switching an input method, and effectively improves efficiency and accuracy of text input.

Optionally, the at least two input methods include at least two of the following: a key input method, a voice input method, and a handwriting input method.

Optionally, when the at least two input methods include the key input method, an input operation area of the key input method includes a keypad area.

The terminal 140 further includes:

a first obtaining module, configured to, when it is detected that a currently used input method is an input method other than the key input method in the at least two input methods, and it is detected that a key in the keypad area is tapped, clear all text in the input operation area of the currently used input method, switch the currently used input method to the key input method, and obtain text information input in the keypad area.

Optionally, when the at least two input methods include the handwriting input method, an input operation area of the handwriting input method includes a handwriting area.

The terminal 140 further includes:

a second obtaining module, configured to, when a handwriting operation in the handwriting area is detected, determine that a currently used input method is the handwriting input method, and obtain text information input in the handwriting area.

Optionally, when the at least two input methods include the voice input method, the terminal 140 further includes:

a third obtaining module, configured to, when voice information of a user is detected and there is no input operation performed by using another input method on the text editing interface, obtain collected voice information, and convert the voice information into text information.

Optionally, the terminal 140 further includes:

a third display module, configured to, when it is detected that one of the at least two input methods is used for text input, display at least one group of candidate text corresponding to input information in the input operation area of the currently used input method; and an adding module, configured to, when it is detected that a group of candidate text in the at least one group of candidate text is selected, add the selected text to the text display area.

Optionally, the input operation areas of the at least two input methods on the currently displayed text editing interface include an input operation area of a first input method and an input operation area of a second input method, and do not include an input operation area of a third input method; and the terminal 140 further includes a second display module, configured to display a new text editing interface when a switching operation for switching from the first input method to the third input method is detected, where the new text editing interface includes: the input operation of the second input method area, the input operation area of the third input method, and the text display area, and the third input method is different from both the first input method and the second input method.

Optionally, the switching operation for switching from the first input method to the third input method is a tapping operation of tapping a switch key that is displayed on the text editing interface and that is used to instruct to switch an input method.

The terminal device provided in this embodiment of this disclosure can implement each process implemented by the terminal in the text input method embodiment, and details are not described here again to avoid repetition.

Figure 15:
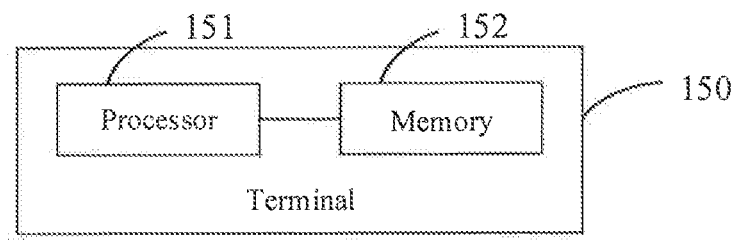
FIG. 15 is a schematic structural diagram of a terminal according to Embodiment 3 of this disclosure.

FIG. 15 is a schematic structural diagram of a terminal 150 according to Embodiment 3 of this disclosure. The terminal 150 includes a processor 151, a memory 152, and a computer program stored on the memory 152 and capable of running on the processor 151. The processor 151 implements the following steps when executing the program:

displaying a text editing interface when a trigger operation for triggering text input is detected, where the text editing interface includes: input operation areas of at least two input methods and text display areas for displaying text input by using the input methods; and keeping displaying the input operation areas of the at least two input methods on the currently displayed text editing interface when a switching operation for switching from one of the currently used at least two input methods to another input method is detected on the currently displayed text editing interface.

The terminal in this embodiment of this disclosure can display the text editing interface on which the at least two input methods can be used for text input, and a user can use the at least two input methods on the currently displayed text editing interface for text input. This avoids frequent switching between text editing interfaces in switching an input method, and effectively improves efficiency and accuracy of text input.

Optionally, the at least two input methods include at least two of the following: a key input method, a voice input method, and a handwriting input method.

Optionally, when the at least two input methods include the key input method, an input operation area of the key input method includes a keypad area.

Optionally, when the computer program is executed by the processor 151, the following steps may be further implemented:

the step of keeping displaying the input operation areas of the at least two input methods on the currently displayed text editing interface when a switching operation for switching from one of the currently used at least two input methods to another input method is detected on the currently displayed text editing interface includes:

when it is detected that a currently used input method is an input method other than the key input method in the at least two input methods, and it is detected that a key in the keypad area is tapped, clearing all text in the input operation area of the currently used input method, switching the currently used input method to the key input method, and obtaining text information input in the keypad area.

Optionally, when the at least two input methods include the handwriting input method, an input operation area of the handwriting input method includes a handwriting area.

Optionally, when the computer program is executed by the processor 151, the following steps may be further implemented:

after the step of displaying a text editing interface, the method further includes:

when a handwriting operation in the handwriting area is detected, determining that a currently used input method is the handwriting input method, and obtaining text information input in the handwriting area.

Optionally, when the at least two input methods include the voice input method, and when the computer program is executed by the processor 151, the following steps may be further implemented:

after the step of displaying a text editing interface, the method further includes:

when voice information of a user is detected and there is no input operation performed by using another input method on the text editing interface, obtaining collected voice information, and converting the voice information into text information.

Optionally, when the computer program is executed by the processor 151, the following steps may be further implemented:

after the step of displaying a text editing interface, the method further includes:

when it is detected that one of the at least two input methods is used for text input, displaying at least one group of candidate text corresponding to input information in the input operation area of the currently used input method; and when it is detected that a group of candidate text in the at least one group of candidate text is selected, adding the selected text to the text display area.

Optionally, when the computer program is executed by the processor 151, the following steps may be further implemented:

the input operation areas of the at least two input methods on the currently displayed text editing interface include an input operation area of a first input method and an input operation area of a second input method, and do not include an input operation area of a third input method, and after the step of displaying a text editing interface, the method further includes:

when a switching operation for switching from the first input method to the third input method is detected, displaying a new text editing interface, where the new text editing interface includes: the input operation of the second input method area, the input operation area of the third input method, and the text display area, and the third input method is different from both the first input method and the second input method.

Optionally, the switching operation for switching from the first input method to the third input method is a tapping operation of tapping a switch key that is displayed on the text editing interface and that is used to instruct to switch an input method.

Figure 16:
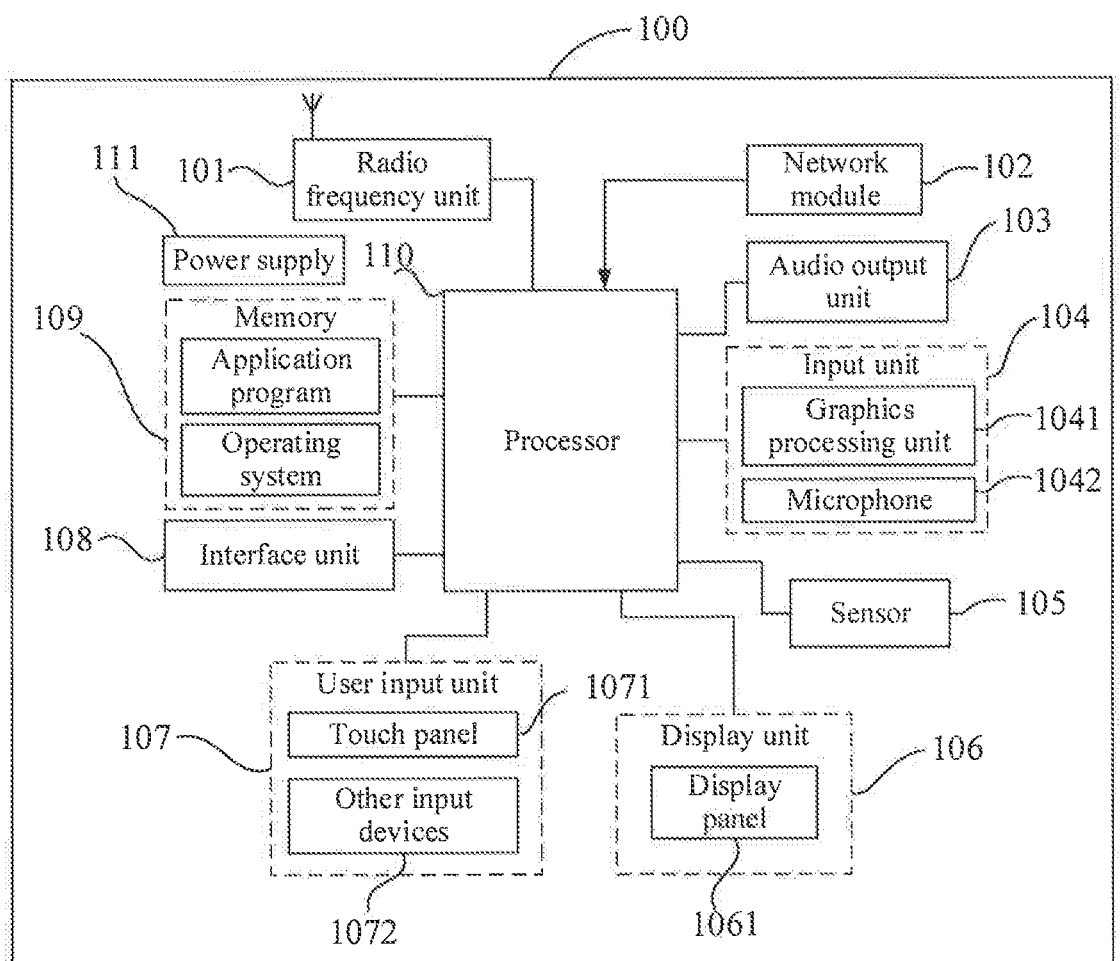
FIG. 16 is a schematic diagram of a hardware structure of a terminal for implementing the embodiments of this disclosure.

FIG. 16 is a schematic diagram of a hardware structure of a terminal 100 for implementing the embodiments of this disclosure. The terminal 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the terminal is not limited to a terminal structure shown in FIG. 16. The terminal may include more or fewer parts than that shown in the figure, or some parts may be combined, or an arrangement of parts may be different. In this embodiment of this disclosure, the terminal includes but is not limited to a mobile phone, a tablet computer, a notebook computer, a palmtop computer, an in-vehicle terminal, a wearable device, a pedometer, and the like.

The processor 110 is configured to display a text editing interface when a trigger operation for triggering text input is detected, where the text editing interface includes: input operation areas of at least two input methods and text display areas for displaying text input by using the input methods; and keep displaying the input operation areas of the at least two input methods on the currently displayed text editing interface when a switching operation for switching from one of the currently used at least two input methods to another input method is detected on the currently displayed text editing interface.

In this embodiment of this disclosure, the text editing interface on which the at least two input methods can be used for text input is displayed, so that a user can use the at least two input methods on the currently displayed text editing interface for text input. This can avoid frequent switching between text editing interfaces in switching an input method, and effectively improve efficiency and accuracy of text input.

It should be understood that in this embodiment of this disclosure, the radio frequency unit 101 may be configured to receive and send information, or to receive and send a signal in a call process, and specially, after receiving downlink data from a base station, send the downlink data to the processor 110 for processing; and also send uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may further communicate with a network and another device through a wireless communications system.

The terminal provides a user with wireless broadband internet access through the network module 102, for example, helping the user to send or receive an email, to browse a web page, or to access streaming media.

The audio output unit 103 may convert audio data received by the radio frequency unit 101 or the network module 102 or stored in the memory 109 into an audio signal and output the audio signal as a sound. Furthermore, the audio output unit 103 may also provide audio output (for example, a call signal received sound or a message received sound) related to a specific function performed by the terminal 100. The audio output unit 103 includes a speaker, a buzzer, a telephone receiver, and the like.

The input unit 104 is configured to receive an audio or video signal. The input unit 104 may include a graphics processing unit (GPU) 1041 and a microphone 1042, and the graphics processing unit 1041 processes image data of a still picture or a video obtained by an image capture apparatus (for example, a camera) in an image capture mode or a video capture mode. A processed image frame may be displayed on the display unit 106. The image frame processed by the graphics processing unit 1041 may be stored in the memory 109 (or another storage medium) or sent by the radio frequency unit 101 or the network module 102. The microphone 1042 can receive a sound and can process the sound into audio data. The processed audio data can be converted into a format that can be sent to a mobile communication base station through the radio frequency unit 101 in a telephone call mode, for outputting.

The terminal 100 further includes at least one sensor 105, for example, an optical sensor, a motion sensor, and other sensors. Specifically, the optical sensor includes an ambient light sensor and a proximity sensor, where the ambient light sensor can adjust luminance of the display panel 1061 based on brightness of ambient light, and the proximity sensor can turn off the display panel 1061 and/or backlight when the terminal 100 is moved to an ear. As a type of motion sensor, an accelerometer sensor can detect magnitudes of accelerations in all directions (usually three axes), can detect a magnitude and a direction of gravity when the terminal is in a static state, and can be applied to terminal posture recognition (such as screen switching between portrait mode and landscape mode, related games, and magnetometer posture calibration), functions related to vibration recognition (such as pedometer and tapping), and the like. The sensor 105 may also include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by the user or information provided for the user. The display unit 106 may include a display panel 1061, and the display panel 1061 may be configured in the form of a liquid crystal display (LCD), an organic light-emitting diode (OLED), or the like.

The user input unit 107 may be configured to receive input digit or character information and generate key signal input related to user setting and function control of the terminal. Specifically, the user input unit 107 includes a touch panel 1071 and other input devices 1072. The touch panel 1071, also referred to as a touchscreen, may capture a touch operation performed by a user on or near the touch panel (for example, an operation performed by the user on the touch panel 1071 or near the touch panel 1071 by using any appropriate object or accessory such as a finger or a stylus). The touch panel 1071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 110, and receives and executes a command sent by the processor 110. In addition, the touch panel 1071 may be implemented in a plurality of forms, for example, as a resistive, capacitive, infrared, or surface acoustic wave touch panel. The user input unit 107 may further include the other input devices 1072 in addition to the touch panel 1071. Specifically, the other input devices 1072 may include but are not limited to a physical keyboard, a function key (such as a volume control key or a power on/off key), a trackball, a mouse, a joystick, and the like. Details are not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides a corresponding visual output on the display panel 1061 based on the type of the touch event. Although in FIG. 16, the touch panel 1071 and the display panel 1061 act as two independent parts to implement input and output functions of the terminal, in some embodiments, the touch panel 1071 and the display panel 1061 may be integrated to implement the input and output functions of the terminal. This is not specifically limited herein.

The interface unit 108 is an interface between an external apparatus and the terminal 100. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 108 may be configured to: receive input (for example, data information and power) from the external apparatus, and transmit the received input to one or more elements within the terminal 100, or may be configured to transmit data between the terminal 100 and the external apparatus.

The memory 109 may be configured to store a software program and various data. The memory 109 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 109 may include a high-speed random access memory, or may include a non-volatile memory, for example, at least one magnetic disk storage device, a flash memory device, or other volatile solid-state storage devices.

The processor 110 is a control center of the terminal, and is connected to all components of the entire terminal by using various interfaces and lines. By running or executing a software program and/or module that is stored in the memory 109 and calling data stored in the memory 109, the processor 110 executes various functions of the terminal and processes data, so as to perform overall monitoring on the terminal. The processor 110 may include one or more processing units. Optionally, an application processor and a modem processor may be integrated into the processor 110. The application processor mainly processes an operating system, a user interface, an application program, and the like. The modem processor mainly processes wireless communication. It may be understood that the modem processor may alternatively not be integrated into the processor 110.

The terminal 100 further includes the power supply 111 (for example, a battery) supplying power to all components. Optionally, the power supply 111 may be logically connected to the processor 110 through a power management system. In this way, functions such as charge management, discharge management, and power consumption management are implemented by using the power management system.

In addition, the terminal 100 includes some functional modules that are not shown, details of which are not described herein.

An embodiment of this disclosure further provides a computer-readable storage medium, where a computer program is stored in the computer-readable storage medium. When the computer program is executed by a processor, processes of the foregoing text input method embodiment can be implemented, with the same technical effects achieved. To avoid repetition, details are not described herein again. The computer-readable storage medium is, for example, a read-only memory (ROM), a random access memory (RAM), a magnetic disk, an optical disc.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially, or a part contributing to the prior art may be implemented in a form of a software product. The computer software product is stored in a storage medium (for example, a ROM/RAM, a magnetic disc, or an optical disk), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A text input method, and comprising:
   displaying, by a terminal, a text editing interface when a trigger operation for triggering text input is detected, wherein the text editing interface comprises: input operation areas of two input methods and text display areas for displaying text input by using the input methods; and
   replacing, by the terminal, the input operation area of one of the currently used two input methods with an input operation area of a third input method, and keeping, by the terminal, displaying input operation areas of two input methods on a new text editing interface when a switching operation for switching from the one of the currently used two input methods to the third input method is detected on the currently displayed text editing interface;
   wherein the third input method is different from both the first input method and the second input method;
   wherein the two input methods and the third input method comprise a key input method, a handwriting input method and a voice input method.

2. The text input method according to claim 1, wherein when the third input method is the key input method, an input operation area of the key input method comprises a keypad area; and
   the step of replacing, by the terminal, the input operation area and the text display area of one of the currently used two input methods with the input operation area and the text display area of the third input method, and keeping, by the terminal, displaying the input operation areas of the two input methods on the currently displayed text editing interface when the switching operation for switching from the one of the currently used two input methods to the third input method is detected on the currently displayed text editing interface comprises:
   when it is detected that a currently used input method is an input method other than the key input method, and it is detected that a key in the keypad area is tapped, clearing all text in the input operation area of the currently used input method, switching the currently used input method to the key input method, and obtaining text information input in the keypad area.

3. The text input method according to claim 1, wherein when the two input methods comprise the handwriting input method, an input operation area of the handwriting input method comprises a handwriting area; and after the step of displaying, by the terminal, the text editing interface, the method further comprises:

when a handwriting operation in the handwriting area is detected, determining that a currently used input method is the handwriting input method, and obtaining text information input in the handwriting area.

4. The text input method according to claim 1, wherein when the two input methods comprise the voice input method, after the step of displaying, by the terminal, the text editing interface, the method further comprises:

when voice information of a user is detected and there is no input operation performed by using another input method on the text editing interface, obtaining collected voice information, and converting the voice information into text information.

5. The text input method according to claim 1, wherein after the step of displaying, by the terminal, the text editing interface, the method further comprises:

when it is detected that one of the two input methods is used for text input, displaying at least one group of candidate text corresponding to input information in the input operation area of the currently used input method; and when it is detected that a group of candidate text in the at least one group of candidate text is selected, adding the selected text to the text display area.

6. A terminal, comprising a processor, a memory, and a computer program stored in the memory and capable of running on the processor, wherein the computer program is executed by the processor to implement:

displaying a text editing interface when a trigger operation for triggering text input is detected, wherein the text editing interface comprises: input operation areas of two input methods and text display areas for displaying text input by using the input methods; and replacing the input operation area of one of the currently used two input methods with an input operation area of a third input method, and keeping displaying input operation areas of two input methods on a new text editing interface when a switching operation for switching from the one of the currently used two input methods to the third input method is detected on the currently displayed text editing interface;

wherein the third input method is different from both the first input method and the second input method;

wherein the two input methods and the third input method comprise a key input method, a handwriting input method and a voice input method.

7. The terminal according to claim 6, wherein when the third input method is the key input method, an input operation area of the key input method comprises a keypad area; and the computer program is further executed by the processor to implement:

when it is detected that a currently used input method is an input method other than the key input method, and it is detected that a key in the keypad area is tapped, clearing all text in the input operation area of the currently used input method, switching the currently used input method to the key input method, and obtaining text information input in the keypad area.

8. The terminal according to claim 6, wherein when the two input methods comprise the handwriting input method, an input operation area of the handwriting input method comprises a handwriting area; and the computer program is further executed by the processor to implement:

after the step of displaying a text editing interface, when a handwriting operation in the handwriting area is detected, determining that a currently used input method is the handwriting input method, and obtaining text information input in the handwriting area.

9. The terminal according to claim 6, wherein the computer program is further executed by the processor to implement:

when the two input methods comprise the voice input method, after the step of displaying the text editing interface, when voice information of a user is detected and there is no input operation performed by using another input method on the text editing interface, obtaining collected voice information, and converting the voice information into text information.

10. The terminal according to claim 6, wherein the computer program is further executed by the processor to implement:

after the step of displaying the text editing interface, when it is detected that one of the two input methods is used for text input, displaying at least one group of candidate text corresponding to input information in the input operation area of the currently used input method; and when it is detected that a group of candidate text in the at least one group of candidate text is selected, adding the selected text to the text display area.

11. A non-transitory computer-readable storage medium storing a computer program thereon, wherein the computer program is executed by a processor to implement:

displaying a text editing interface when a trigger operation for triggering text input is detected, wherein the text editing interface comprises: input operation areas of two input methods and text display areas for displaying text input by using the input methods; and replacing the input operation area of one of the currently used two input methods with an input operation area of a third input method, and keeping displaying input operation areas of input methods on a new text editing interface when a switching operation for switching from the one of the currently used two input methods to the third input method is detected on the currently displayed text editing interface;

wherein the third input method is different from both the first input method and the second input method;

wherein the two input methods and the third input method comprise a key input method, a handwriting input method and a voice input method.

12. The non-transitory computer-readable storage medium according to claim 11, wherein when the third input method is the key input method, an input operation area of the key input method comprises a keypad area; and the computer program is further executed by the processor to implement:

when it is detected that a currently used input method is an input method other than the key input method, and it is detected that a key in the keypad area is tapped, clearing all text in the input operation area of the currently used input method, switching the currently used input method to the key input method, and obtaining text information input in the keypad area.

13. The non-transitory computer-readable storage medium according to claim 11, wherein when the two input methods comprise the handwriting input method, an input operation area of the handwriting input method comprises a handwriting area; and the computer program is further executed by the processor to implement:

after the step of displaying the text editing interface, when a handwriting operation in the handwriting area is detected, determining that a currently used input method is the handwriting input method, and obtaining text information input in the handwriting area.

14. The non-transitory computer-readable storage medium according to claim 11, wherein the computer program is further executed by the processor to implement:

when the two input methods comprise the voice input method, after the step of displaying the text editing interface, when voice information of a user is detected and there is no input operation performed by using another input method on the text editing interface, obtaining collected voice information, and converting the voice information into text information.

15. The non-transitory computer-readable storage medium according to claim 11, wherein the computer program is further executed by the processor to implement:

after the step of displaying the text editing interface, when it is detected that one of the two input methods is used for text input, displaying at least one group of candidate text corresponding to input information in the input operation area of the currently used input method; and when it is detected that a group of candidate text in the at least one group of candidate text is selected, adding the selected text to the text display area.

\* \* \* \* \*